(No Model.)
W. & T. HAWKINS.
HYDROGEN GAS GENERATOR.
No. 490,437. Patented Jan. 24, 1893.
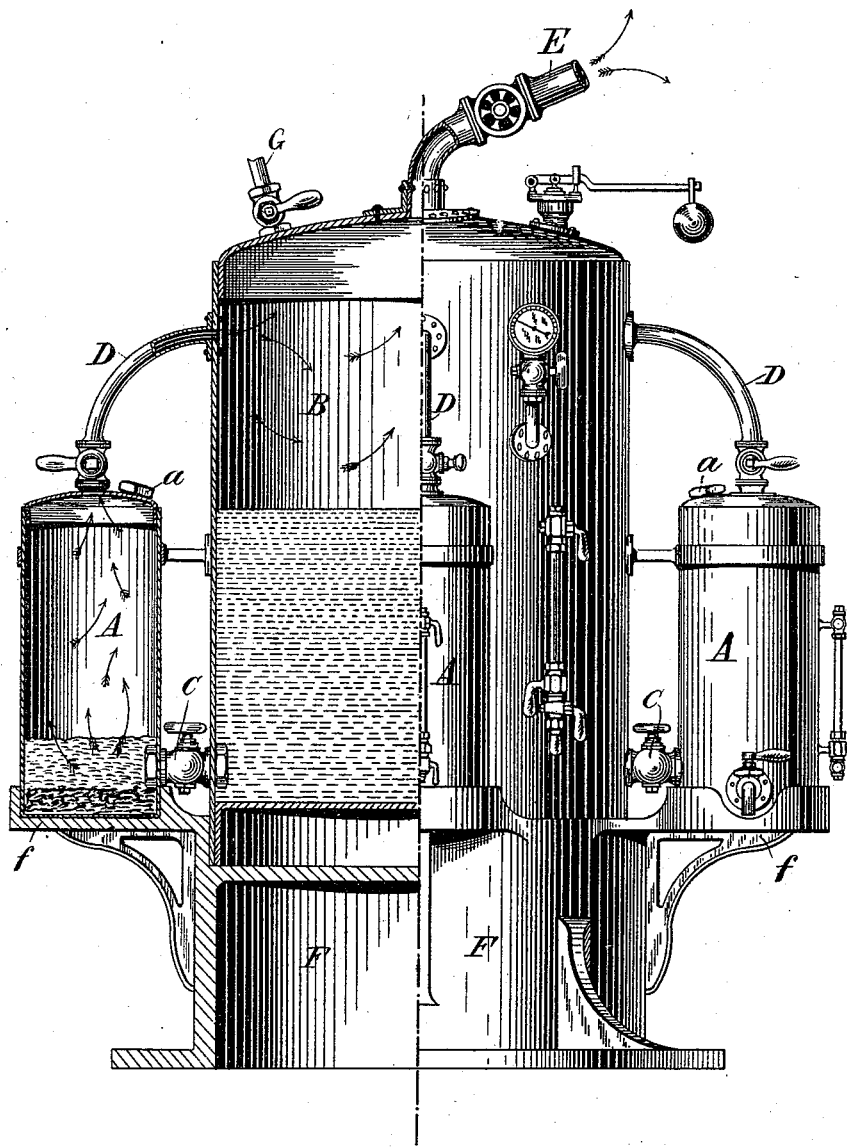

UNITED STATES PATENT OFFICE.

WILLIAM HAWKINS AND THOMAS HAWKINS, OF PORTSMOUTH, ENGLAND.

HYDROGEN-GAS GENERATOR.

SPECIFICATION forming part of Letters Patent No. 490,437, dated January 24, 1893.

Application filed November 12, 1891. Serial No. 411,764. (No model.) Patented in England August 20, 1891, No. 14,051, and in Luxemburg November 14, 1891, No. 9,528.

*To all whom it may concern:*

Be it known that we, WILLIAM HAWKINS and THOMAS HAWKINS, mechanicians, both of 41 Hale Street, Lake Road, Landport, Portsmouth, county of Hants, England, have invented certain new and useful Improvements in and Relating to Hydrogen Gas Generators, (patented in Luxemburg November 14, 1891, No. 9,528, and in England August 20, 1891, No. 14,051;) and we do hereby declare that the following is a full, clear, and exact description thereof.

This our invention relates to improvements in and relating to hydrogen gas generators, and the invention consists of a special apparatus for the manufacture of hydrogen gas, the said gas being applicable for a variety of purposes.—It may be utilized as a source of power for aerial navigation and a number of other purposes.

In carrying our invention into practice we take the following ingredients in about the proportions specified and mix them together as hereinafter explained; steel two parts iron two parts zinc one part or we may omit the iron, using zinc one part and steel four parts, or zinc one part and iron four parts may be used and the steel omitted. More zinc may be added, if required, according to the character of the metals employed or the purposes for which the gas is proposed to be employed. The zinc is melted by the application of heat in a suitable vessel and after the fusion has taken place the steel and iron or the steel or iron (the iron and steel employed being preferably in the form of small filings, borings or shavings) is stirred into the molten zinc. A spongy agglomerate mass is thereby produced which may be molded, if desired, into cakes or thin blocks of a suitable shape. The said cakes or thin blocks are then placed in a generator, the preferable form of which is illustrated partly in section and partly in elevation in the accompanying drawing. The said generator consists of a suitable vessel A of earthenware, glass, or other acid resisting material, having an opening *a* for the insertion of the metallic cakes or thin blocks before mentioned, said opening being adapted to be closed by a plug or other means, and a supply pipe and valve C attached to the lower end of generator. The said supply pipe communicates with a tank or reservoir B containing water acidulated with sulphuric and hydrochloric acids combined or with sulphuric or hydrochloric acid, in sufficient quantity to evolve the gas, more acid being added as required. As illustrated in the drawing several generators A may be conveniently arranged around the said supply tank B. Any required number of generators may be employed.

Upon opening the valves C the water and acid contained in the vessel B are admitted to the generators A and by the contact of the liquid with the metals therein chemical action is set up and gas is evolved which passes through the pipes D as indicated by the arrows in the drawing, into the upper part of the reservoir or tank B, where it accumulates and from whence it may be conveyed through a pipe or conduit E and utilized for the desired purpose.

Water gages, pressure gages, safety valves and other required fittings may be attached to the apparatus as may be found desirable.

The supply tank is preferably mounted upon a suitable base F of any approved design provided with shelves *f* for the support of the generating vessels and the said base may be bolted, screwed, or otherwise secured upon any desired foundation or bed. Upon the commencement of the chemical action the air contained in the apparatus is allowed to escape by opening the blow off cock G upon the upper part of the tank B. As the gas passes out of the pipe E it may either be stored in a suitable gas-holder or it may be taken direct to the motor or other apparatus for which it is intended to be used. The said gas when mixed with a suitable quantity of oxygen or atmospheric air possesses a high explosive force. It may be compressed and stored in suitable receivers. It also possesses a very low specific gravity and may therefore be used to great advantage for the purpose of filling balloons and aerial machines by reason of its lightness and the facility with which it may be generated. For the purpose of recharging a balloon in the air as the gas exudes it will be found invaluable. It may also be used for motive power purposes, being adapted for use with an ordinary gas engine. In this case the gas and air are admitted in suitable proportions into the cylinder and fired in the usual and well known manner. The explosive force of the combined gas and air will be found to develop horse power from the engine much more advantageously than when coal gas is employed and in consequence of the ease with which it may be stored and generated it may be used with great advantage for driving marine engines for sea and river navigation. It may also be employed for a variety of other purposes as will be readily understood by those skilled in the art to which it appertains and we do not wish to confine ourselves to any particular application of the said gas.

Having now particularly described and ascertained the nature of our said invention and in what manner the same is to be performed, we declare that what we claim is:

1. In combination with a generating chamber, a single chamber B to contain the acid solution in its lower part and the gas in its upper part, the valved fluid inlet pipe between the lower part of the chamber B and the generating chamber and the valved gas outlet pipe between the generating chamber and the upper part of the chamber B, substantially as described.

2. In combination with a stand or base F and a series of brackets extending therefrom, a central chamber B supported thereby and containing the acid solution, a series of generating chambers supported by the brackets and having independent valved pipe connections with the upper and lower parts of the chamber B, substantially as described.

3. In combination with a single chamber B to contain the acid solution in its lower part and the gas in its upper part, a series of generators arranged around said chamber B and in connection therewith at the bottom by valved inlet pipes, with valved outlet pipes between the generators and the said chamber at the upper part for the gas and an outlet pipe from the chamber B for the gas, substantially as described.

In testimony that we claim the foregoing we have hereunto set our hands this 22d day of October, 1891.

WILLIAM HAWKINS.
THOMAS HAWKINS.

Witnesses:
W. WILSON HORN,
H. G. BISHOP.